United States Patent [19]

Ashwell et al.

[11] Patent Number: 4,946,251
[45] Date of Patent: Aug. 7, 1990

[54] FABRICATION OF OPTICAL WAVEGUIDE

[75] Inventors: Gareth W. B. Ashwell; Benjamin J. Ainslie, both of Ipswich, England

[73] Assignee: British Telecommunications public limited company, United Kingdom

[21] Appl. No.: 403,069

[22] Filed: Sep. 5, 1989

Related U.S. Application Data

[63] Continuation of Ser. No. 249,247, Sep. 26, 1986, abandoned, which is a continuation-in-part of Ser. No. 875,973, Jun. 19, 1986, abandoned.

[30] Foreign Application Priority Data

Jun. 21, 1985 [GB] United Kingdom ............... 8515814

[51] Int. Cl.⁵ .................. G02B 5/14; C03B 37/027
[52] U.S. Cl. .................. 350/96.34; 65/3.11; 65/3.12; 65/30.1; 501/37
[58] Field of Search .............. 350/96, 34; 501/37; 65/3.11, 3.12, 30.1

[56] References Cited

U.S. PATENT DOCUMENTS

| | | | |
|---|---|---|---|
| 3,957,342 | 5/1976 | Newns et al. | 350/96.34 |
| 4,067,641 | 1/1978 | Holton | 350/96.34 X |
| 4,154,503 | 5/1979 | Lettington et al. | 501/37 X |
| 4,585,299 | 4/1986 | Strain | 350/96.12 |
| 4,666,247 | 5/1987 | MacChesney et al. | 65/3.12 |

FOREIGN PATENT DOCUMENTS

| | | |
|---|---|---|
| 8136507/78 | 5/1978 | Australia . |
| 0106752 | 4/1984 | European Pat. Off. . |
| 0132206 | 1/1985 | European Pat. Off. . |
| 0052901 | 6/1986 | European Pat. Off. . |

OTHER PUBLICATIONS

"Vapor Deposition and Properties of Binary Arsenosilicate Glass Films", J. Wong, J. Electrochem. Soc., 1972, 119(8), pp. 1071-1080.

"Segregation and Transport Coefficients of Impurities at the Si/SiO₂ Interface", K. Sakamoto et al, Oct. 30, 86, J. Appl. Physics, 61(4), pp. 1553-1555.

"Redistribution of Acceptor and Donor Impurities During Thermal Oxidation of Silicon", Grove et al, J. Appl. Physics, vol. 35, No. 9, Sep. 1984, pp. 2695-2701.

"Redistribution of Arsenic in Silicon During High Pressure Thermal Oxidation", Choi et al, Dept. of Chemistry & Physics, U. N. Carolina, Jan. 1987, pp. 688-690.

Primary Examiner—Robert L. Lindsay
Attorney, Agent, or Firm—Nixon & Vanderhye .

[57] ABSTRACT

The guiding layers of optical waveguides are formed of arsenosilicate glass (ASG). By varying the arsenic content from 2 to 13 mole percent it is possible to vary the refractive index in the range 1.45 to 1.53. Pure silica or less heavily doped ASG can be used for the cladding layers. The ASG is preferably formed as the result of a heterogeneous reaction between silane and oxygen in the presence of arsine. Such a reaction can be carried out at temperatures down to 390° C., allowing the ASG to be used on substrates of III-V compounds.

21 Claims, 11 Drawing Sheets

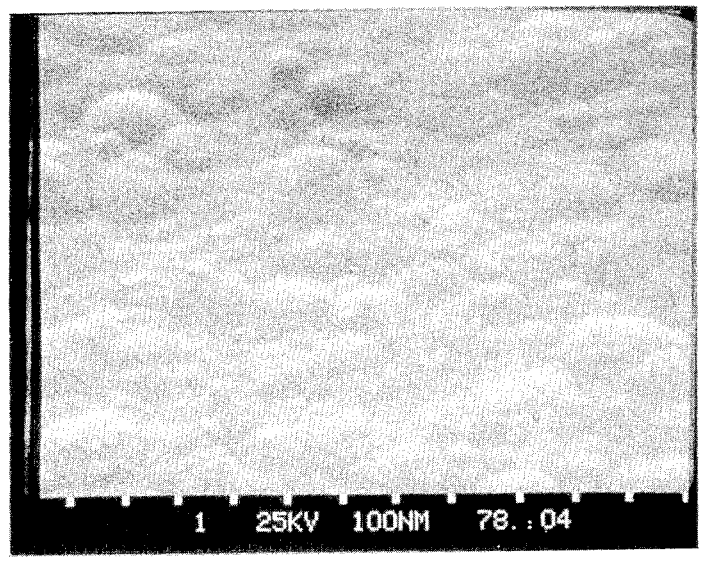
Fig. 4. Typical PSG 450°C Deposition
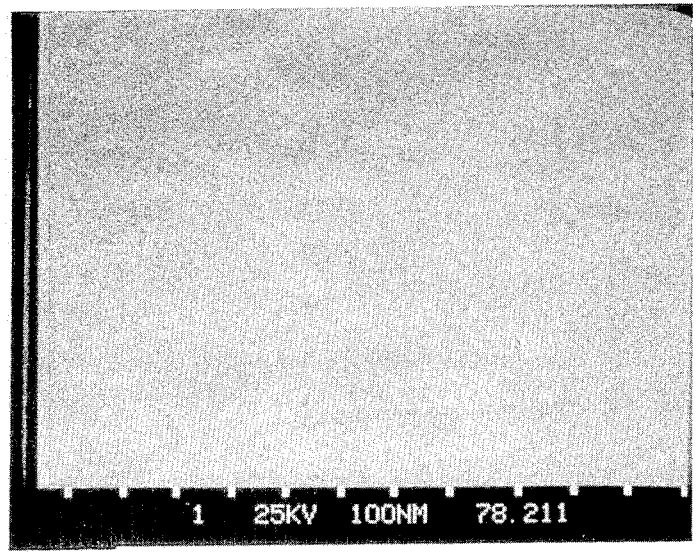
Fig. 5. 10 mole % ASG 450°C Deposition

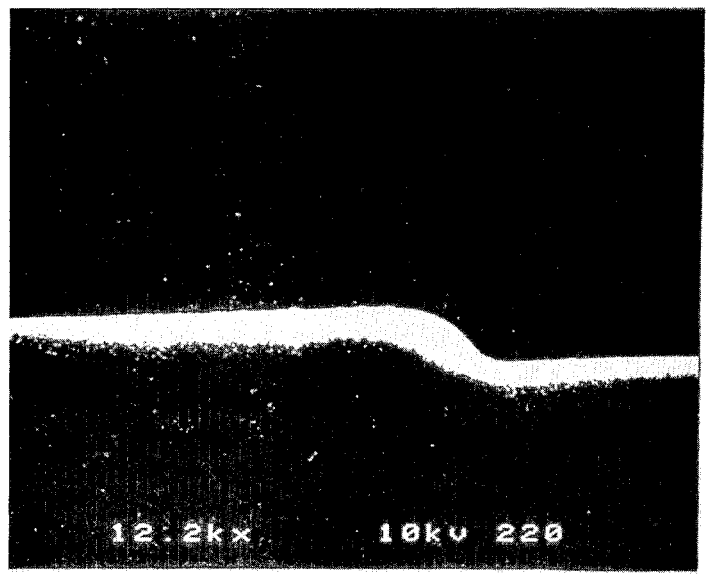
*Fig. 9.* An ASG Film Reflowed At 800°C
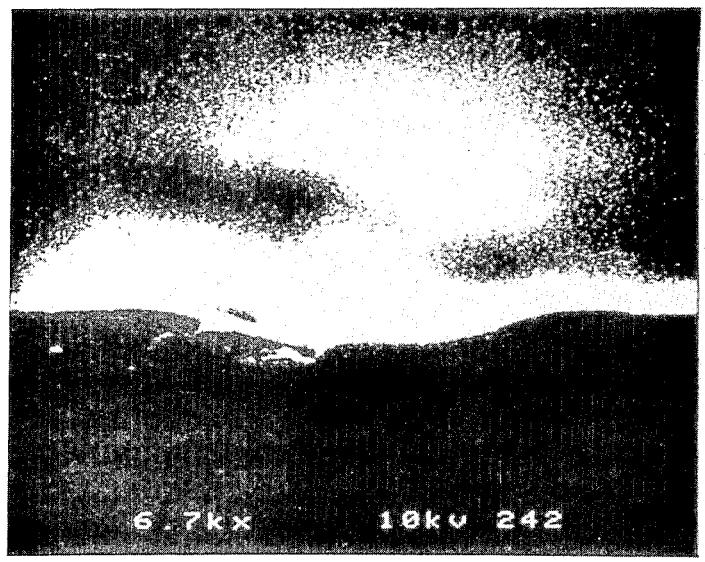
*Fig. 10.* An ASG Film Reflowed At 900°C

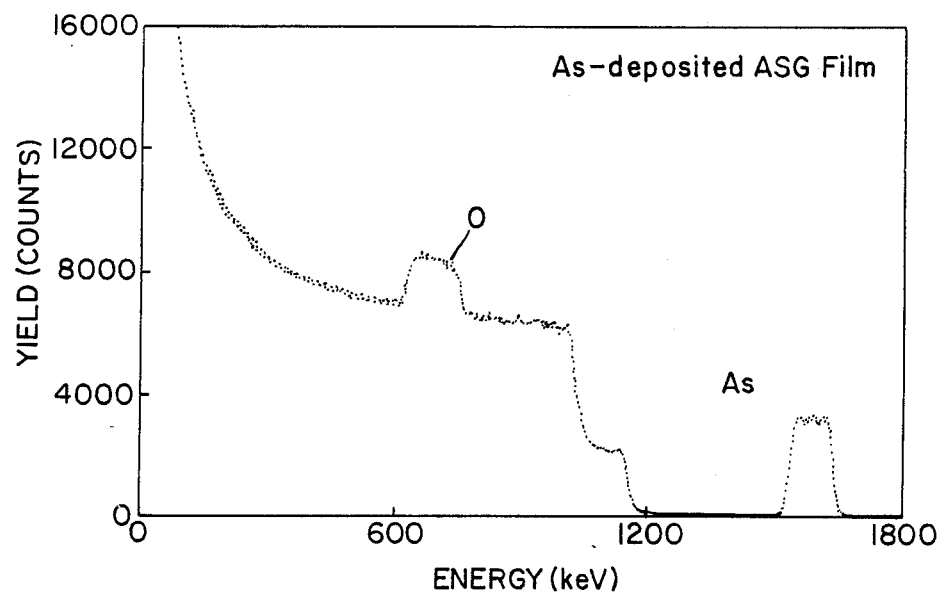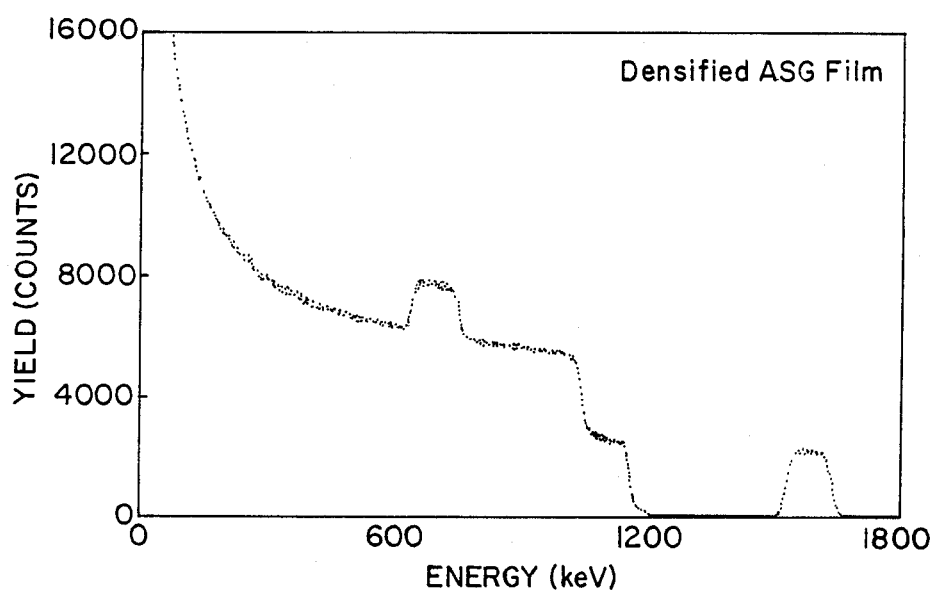
*Fig. 11.* The RBS Spectra of As-deposited And Densified Films.

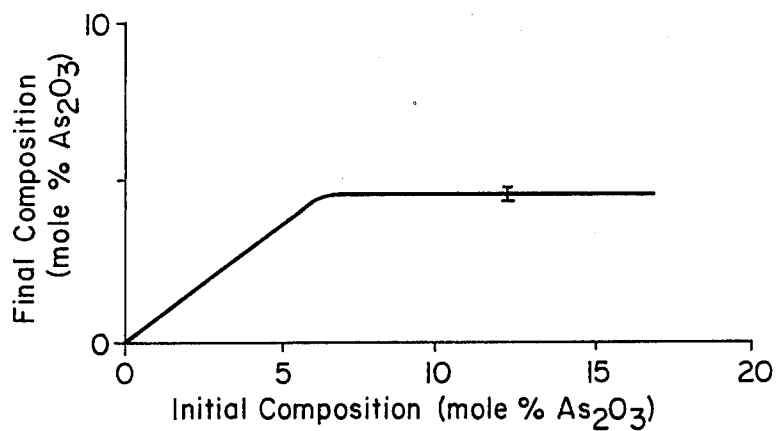
*Fig. 12.* Compositional Changes During Densification
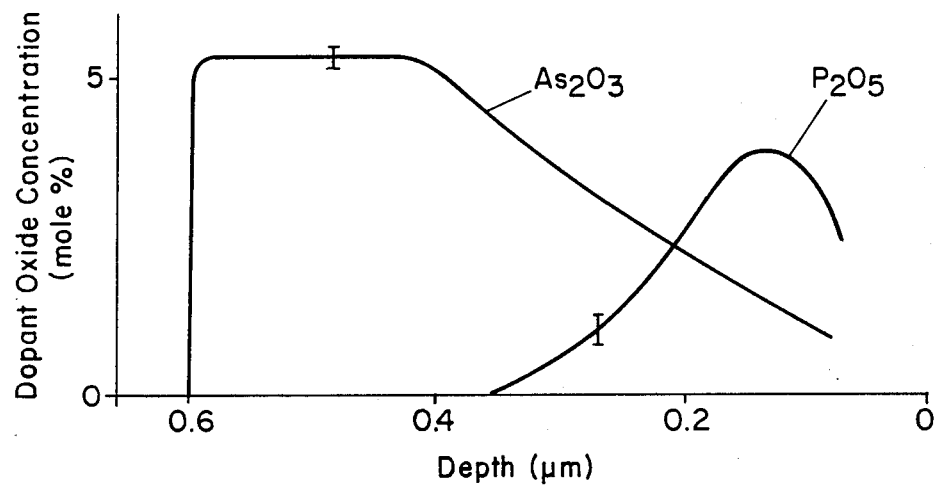
*Fig. 13.* A Depth Profile Of A Densified Film 0·6 μm Thick

FABRICATION OF OPTICAL WAVEGUIDE

This is a continuation of application Ser. No. 249247, filed Sept. 26, 1986, which is a continuation of 875973 filed Jun. 19, 1986, both now abandoned.

The present invention relates to the fabrication of optical waveguides, and in particular to the fabrication of optical waveguides in integrated optical circuits.

In integrated optical circuits it is necessary to provide optical waveguides of controlled refractive index to provide optical connection between the various optical components.

Such optical waveguides have been made by flame hydrolysis, as described in U.S. Pat. No. 3,806,223 of Keck et al. In this method fine glass particles are produced as a soot from the flame of a gas burner which is fed with $SiCl_4$. The soot is deposited on a substrate, such as fused silica, having the appropriate optical and mechanical properties. A less heavily doped silica layer is then formed over the layer of doped soot. Finally, the structure is sintered at about 1500° C. to vitrify and densify the sooty layers.

UK patent application No. 2066805A teaches the use of a furnace in place of a gas burner to hydrolyse halides of Si and Ti, B, P, or Ge, together with oxygen or steam to produce fine glass particles on a substrate heated to 600°–1100° C. Vitrification involved heating the substrate to 1300°–1600° C.

The disadvantage of both these techniques is that they require that the substrate is exposed to very high temperatures, particularly during the vitrification step, which limits the choice of substrate materials (effectively just to high temperature glasses: semiconductors cannot be used) and dopant materials (no volatile species such as arsenic or phosphorus). Moreover, differential thermal expansion between the thin deposited films and the substrate is more detrimental in cooling from high temperatures. Such extreme heating can also lead to poor flatness, rendering subsequent micro lithography difficult.

An alternative approach has been taken by Stutius and Streifer, Applied Optics, Vol 16, No 12, Dec. 1977, pages 3218–3222. They experimented with chemical vapour deposition (CVD) of silicon nitride onto thermally oxidised silicon, and favored low pressure CVD in preference to atmospheric pressure CVD and plasma enhanced CVD, both of which produced high loss films which were subject to cracking. No details of reaction conditions are given, but low pressure CVD of silicon nitride is usually performed at 800°–900° C. using dichlorosilane and ammonia.

The advantages of using CVD instead of flame deposition that the process is carried out at a lower temperature, and by virtue of the reaction mixture mechanism CVD gives rise directly to a film with better coverage and greater integrity (with flame deposition the film is not formed until the sooty layer has been vitrified). In particular, the vitrification step, with its very high temperatures, is avoided.

D K W Lam, Applied Optics, Vol 23, No 16, Aug. 1984, page 2744 to 2746, proposes the use of plasma enhanced chemical vapour deposition (PECVD) as a means of depositing silicon oxynitride ($Si_xO_yN_z$) from Silane ($SiH_4$) and nitrous oxide ($N_2O$) at the very low temperature of 200° C. Because of the low temperature used, the process is said to be suitable for use over III-V semiconductor compounds such as GaAs and InP which decompose at 500° C.; unwanted drive-in diffusion of dopants already in the semiconductor substrate is also avoided.

In spite of the advantages inherent in CVD processes, disadvantages remain with the approaches of both Stutius and Lam. The use of silicon nitride (n 2.01) presents problems in coupling to optical fibres. With Stutius differential thermal expansion can be expected to be problematic. In the Lam process, although the use of plasma enhancement allows the temperature to be dropped to 200° C., energy from the plasma also leads to the formation of Si—Si bonds, extending the UV absorption edge. Indeed in the Stutius and Streifer paper, PECVD is rejected because the films produced in that way contained excess silicon, and no guided mode could be launched at 6328A. Additionally, N—H and O—H bonds may be formed adversely affecting absorption in the near infra-red. Also, silicon oxynitride, produced by CVD, has an unacceptable degree of surface roughness which must be reduced by reflowing at high temperature to reduce scatter loss. Internal defects also occur in CVD silicon nitride and oxynitride, and these too can give rise to high losses unless annealed out (a $CO_2$ laser was used for this by Lam).

Thus it can be seen that there exists a need for a waveguide fabrication process which does not require the use of plasmas or excessively high temperatures. It would also be desirable if the fabrication process produced a smooth surface, and hence avoided the need for laser annealing or high temperature baking to reduce scatter loss to an acceptable level.

According to the present invention there is provided a method of fabricating a waveguide, comprising the steps of forming a layer of arsenosilicate glass on a substrate.

According to a second aspect of the present invention there is provided an optical waveguide comprising a guiding layer of arsenosilicate glass.

The invention will be further described by way of example only with reference to the accompanying drawings in which:

FIG. 4 is a micrograph showing surface roughness typical of conventionally deposited low temperature CVD oxide;

FIG. 5 is a contrasting micrograph showing the smooth surface attainable with arsenosilicate glass produced as the result of a heterogeneous reaction;

FIG. 9 is a micrograph showing the effect or reflowing arsenosilicate glass at 800° C.;

FIG. 10 is a similar micrograph showing the effect of reflowing at 900° C.;

FIG. 11 shows the RBS spectra of as-deposited and densified films of arsenosilicate glass;

FIG. 12 shows the compositional changes experienced by arsenosilicate glass subjected to a typical fabrication sequence;

FIG. 13 is a depth profile of a 0.6 μm densified film of arsenosilicate glass;

Figure 1:
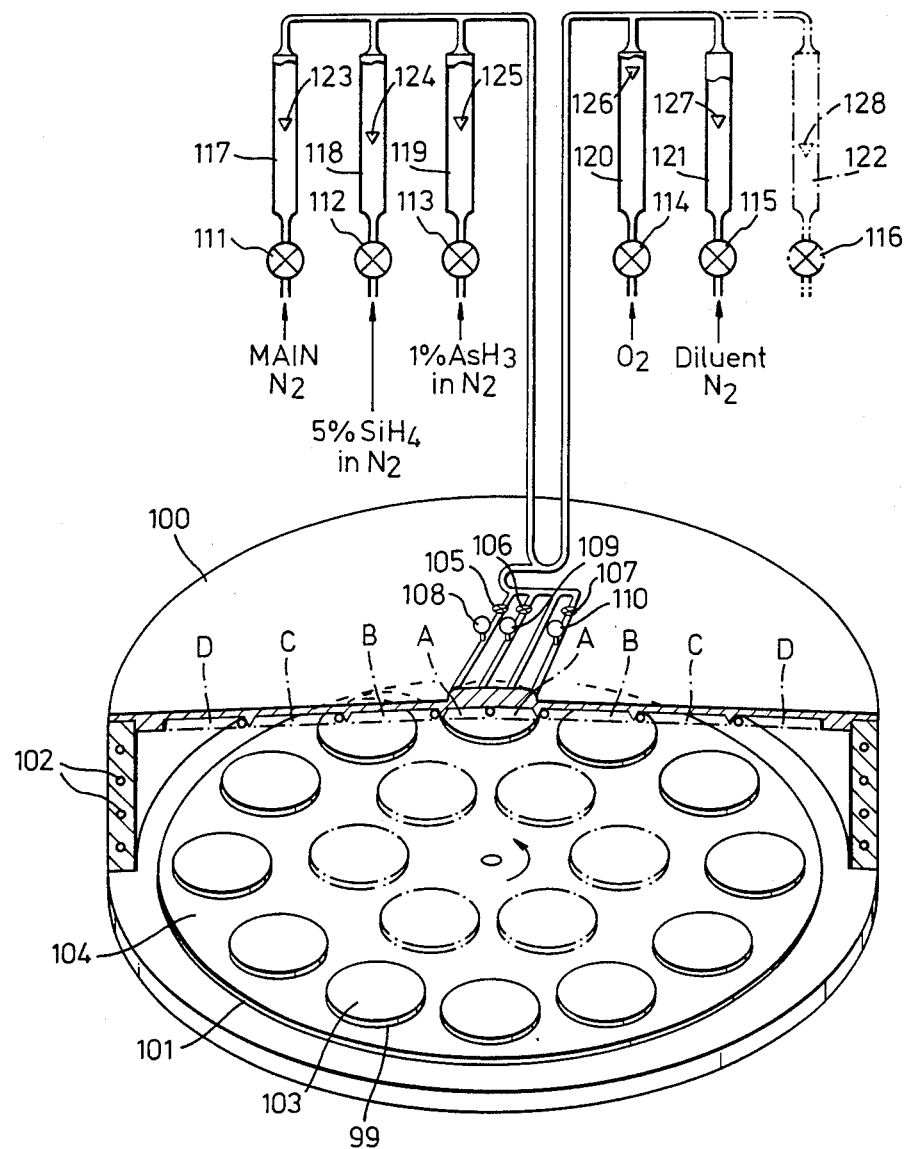
FIG. 1 is a diagrammatic representation of apparatus suitable for use in depositing arsenosilicate glass.

We have discovered that arsenosilicate glass (ASG) is suitable for use as a waveguide, and, moreover, offers suprisingly low loss in the near infra red, despite the fact that the glass is made from hydrides ($SiH_4$ and $AsH_3$) which would be expected to give rise to large losses in the near infra-red. The refractive index of the as deposited film varies with arsenic content, between about 1.53 for 12% As to about 1.45 for 1.7% As. This is a very convenient range, making ASG suitable for use as a guiding layer with silica (n 1.46) cladding, and also enabling the production of waveguides in which the cladding and guiding layers are each made of ASG. Arsenosilicate glass is thus preferable to silicon nitride (n 2.01) for use with $SiO_2$, since a large refractive index difference necessitates the use of very thin waveguides if only low order modes are to be supported. For asymmetric waveguides, where the guiding layer, with refractive index $n_2$, is bounded by two layers whose refractive indexes differ widely ($n_3 >> n_1$) the following equation allows calculation of the thickness, t, required for waveguiding of any particular mode, m=0, 1, 2, . . . ,:

$$\%n = n_2 - n_3 > \frac{(2m+1)^2 \lambda_o^2}{(32 n_2 t^2)}$$

where $\lambda_o$ is the vacuum wavelength (see chapters 2 and 3 of "Integrated Optics:Theory and Technology" by R G Hunsperger, published by Springer-Verlag). A disadvantage of very thin waveguides is that they are difficult to couple to optical fibres.

Arsenosilicate glass is an arsenic doped form of silicon dioxide, and is conventionally produced by reacting silane ($SiH_4$), arsine ($AsH_3$) and oxygen in a CVD reactor. However, the reaction is a homogeneous gas phase reaction and hence the ASG is deposited with a rough surface which needs to be reflowed to reduce scatter loss to an acceptably low level. Arsenic reduces the melting point of silicon dioxide, the melting point decreasing progressively with an increasing concentration of dopant, so that ASG with more than about 10% As can be reflowed at temperatures as low as 800°/900° C. (in steam).

Arsenic is present in ASG in the form of arsenic trioxide ($As_2O_3$) which has a significant vapour pressure over ASG and it can readily be lost by evaporation when the glass is heated. Because of this, the arsenic content of the glass drops during reflowing as a result of which the refractive index also falls. The loss of arsenic is not uniform throughout the thickness of the film; the greatest amount is lost from the surface layers, as will be explained in greater detail below.

Although waveguides can be made by depositing ASG using conventional processes, it is preferably deposited according to the method described in our co-pending European application number 85300172.5 filed Jan. 10, 1985, and published under the number 0150088. In that application we describe how, by using the appropriate reaction conditions, it is possible to modify the reaction mechanism so that the ASG is formed as a conformal coating as the result of a heterogeneous reaction. The reaction can be carried out at temperatures down to below 400° C. without the use of a plasma, and by virtue of the reaction mechanism, the ASG is deposited with a much smoother surface than is achieved with conventional processes. The as deposited density is also improved compared to that of conventional ASG. However, should it be required, the ASG can be baked at 600°–900° C. to further densify and reflow the layer.

The advantages of using ASG deposited as the result of the modified, heterogeneous reaction are that the substrate need not be exposed to high temperatures, no plasma is needed; and the smooth surface produced by the reaction gives rise to low scatter loss, even without being reflowed.

The process by which ASG can be deposited conformally will now be described, and examples will be given of the reaction conditions used to produce ASG films of various compositions.

The ASG is produced in a chemical vapour deposition (CVD) process such as may be carried out in a commercial CVD machine. Machines designed for the silane-oxygen reaction for CVD of silicon dioxide, such as the PYROX Reactor produced by Tempress-Xynetics, are particularly suitable for carrying out the ASG deposition, although other machines may also be suitable. For the purposes of description it will be assumed that a PYROX 216 Reactor is to be used, and such a reactor is shown diagrammatically FIG. 1.

The PYROX Reactor, which provides for batch processing of wafers, has a water cooled 102 reactor head 100 within which there is a rotatable circular table 101 upon which are placed wafers 103 to be treated. The table 101, which supports a graphite wafer carrier 104, is heated from underneath during processing, the temperature of the table 101 and hence of the wafers being measured by means of a thermocouple. In the experiments to be reported, three-inch wafers were used. The wafers were held on silicon carbide coated graphite succeptors 99, arranged in a circle of twelve around the outer ring of an eighteen wafer carrier.

The reactor head consists of four concentric zones which, moving out from the centre, are termed A, B, C, and D. The gas flow to each of these zones can be adjusted to vary the conditions within the reactor head. Separate flow control valves 105, 106 and 107 and pressure gauges 108, 109, and 110 are provided for zones A, B, and C; flow to Zone D is not independently controllable. The composition of the gas fed to the reactor head can be adjusted by flow control valves 111–116 in each of six flowlines, the flowrates in each of the flowlines being monitored by means of rotameters 117–122, containing floats 123–128. In the present case, only five flowlines are required:

| Flowline Identity | Gas Composition | Rotameter Porter Model Number | Float Type |
|---|---|---|---|
| Main Nitrogen | $N_2$ | B250-8 | Stainless Steel |
| Silane | 5% $SiH_4$ in $N_2$ | B125-40 | Stainless Steel |
| Dopant 1 | 1% $AsH_3$ | B125-40 | Stainless Steel |

| Flowline Identity | Gas Composition | Rotameter Porter Model Number | Float Type |
|---|---|---|---|
| Oxygen | $O_2$ in $N_2$ | B125-40 | Stainless Steel |
| Dilution Nitrogen | $N_2$ | B250-8 | Stainless Steel |

Figure 2:
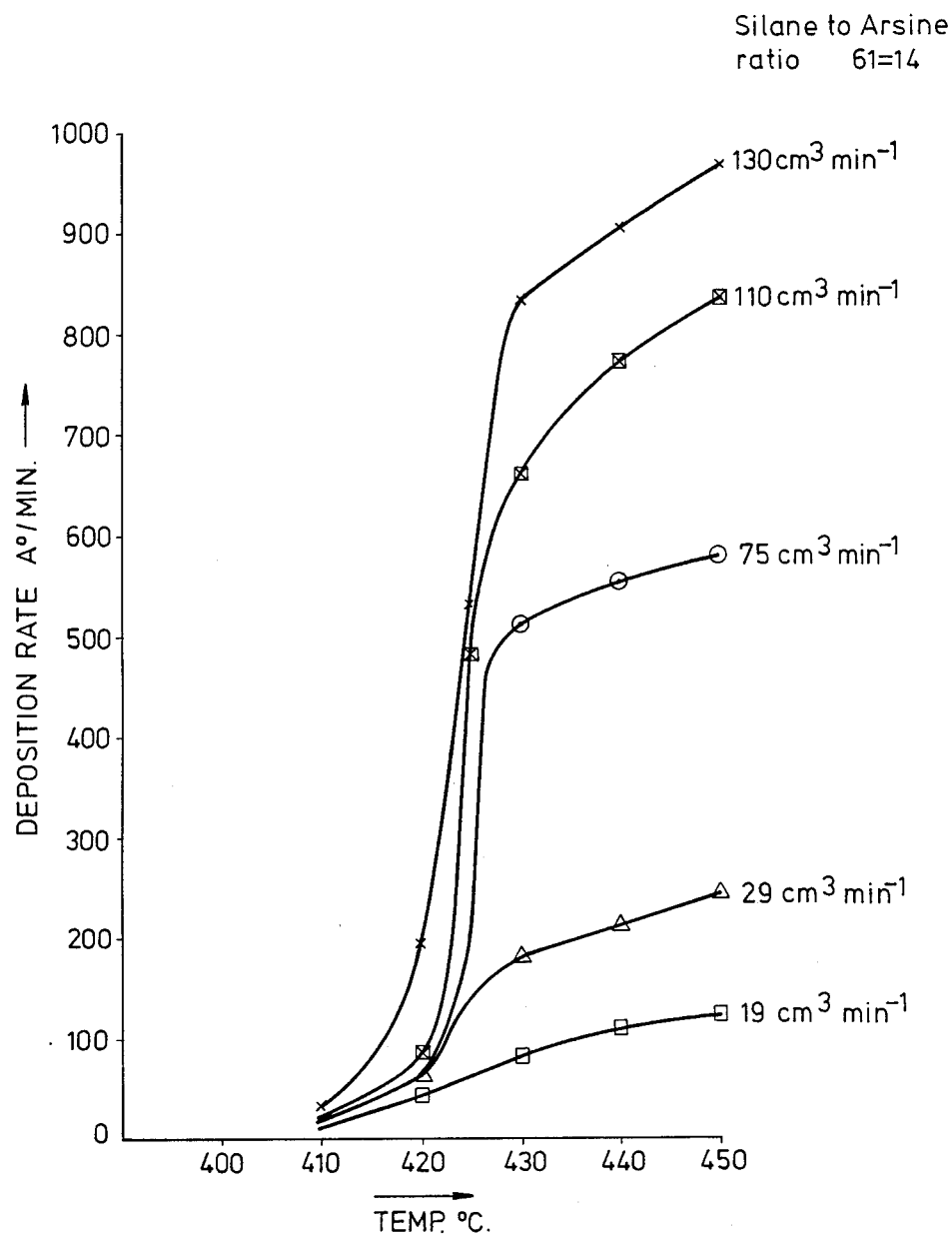
FIG. 2 is a graph showing how changes in the arsine and silane flow rates affect the deposition rate with temperature.

Throughout the experiments the zone pressures were maintained at values routinely used when depositing USG or PSG:
ZONE A: 13 psi
ZONE B: 11 psi
ZONE C: 12 psi
ZONE D - not directly measurable Results for reactions carried out at plate (wafer) temperatures between 400° and 450 degrees C. are shown in FIG. 2. This figure shows how temperature affects the thin film deposition rate for five different total hydride flow rates (19,29,75,110,130 cc/minute) with the oxygen flow rate held constant at 2500 cc/minute, and with the main nitrogen and dilution nitrogen flow rates each held at 38 liters/minute.

Figure 3:
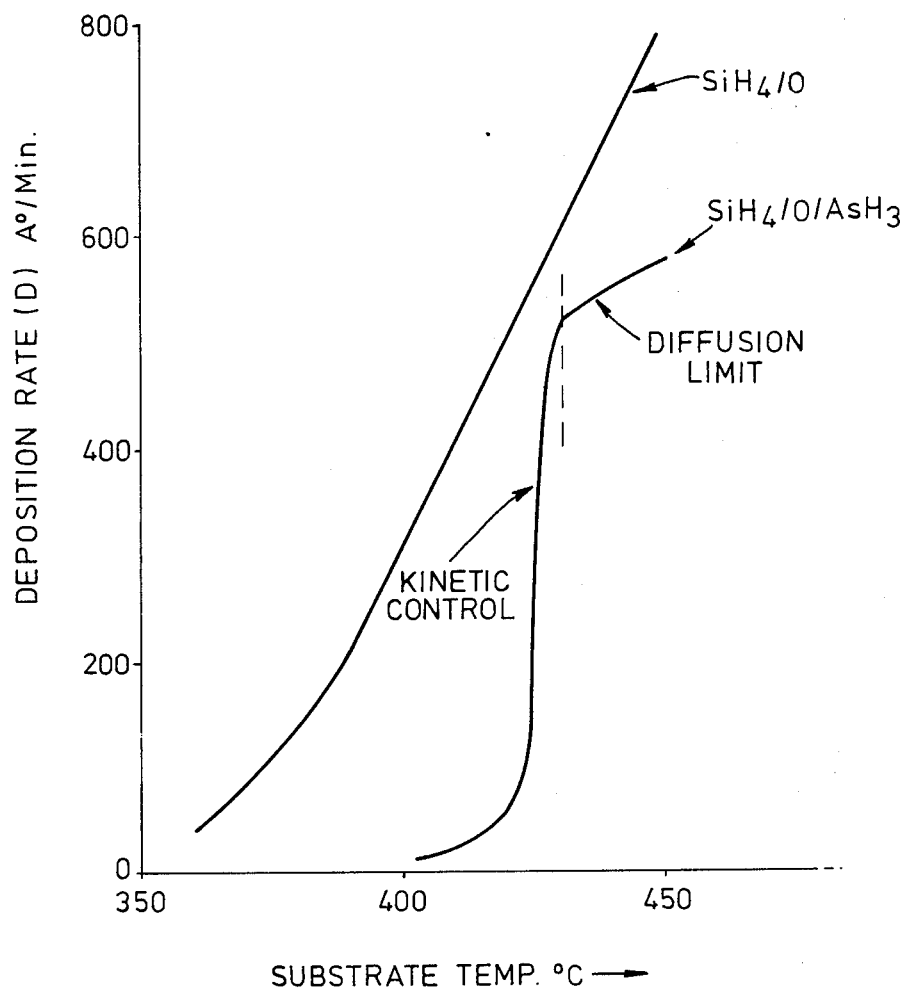
FIG. 3 is a graph of deposition rate against temperature for the silane-oxygen system and the silane-arsine-oxygen system.

It is instructive to compare the deposition vs temperature curves obtained with silane-arsine-oxygen with those obtained with the silane-oxygen system. In FIG. 3 examples of each are compared. The curve for silane-arsine-oxygen (for 75 cc total hydride flow, $SiH_4$: Arsine ratio=61:14) shows the two regions which characterise it as a heterogeneous reaction. In the low temperature region, where there is kinetic control, the deposition rate is reaction rate limited and shows the exponential rise with temperature predicted by the Arrhenius rate equation:

$$D = Ae^{-\%E/RT}$$

with some temperature variation of A (as predicted by the Eyring rate equation). In the second region (the mass transport limited region) the deposition rate is limited by the diffusion rate of the reactants through a very thin depleted zone near the surface which will follow the contours of the surface. By comparison, the silane and oxygen system shows a very small dependence of deposition rate on temperature (in the example illustrated it is practically constant at 9A per °C., which is small when compared to the 29A per °C. to 63° A per °C. for the arsine-silane-oxygen example shown) and the lack of any diffusion limit indicates that it is homogeneous gas phase reaction.

The reaction mechanism determines the type of species that will arrive at the surface. If the reaction is homogeneous, the oxygen and silane react to form silicon dioxide, or a similar species, in the gas phase. These molecules may condense in the gas phase to form colloidal particles. The silicon dioxide will arrive at the surface as particles ranging in size from the monomer to colloidal particles, giving rise to the characteristic rough pebble-like texture of low temperature CVD oxides, as shown in FIG. 4. The reaction parameters such as pressure and gas composition will control the particle size distribution and hence the surface texture. The mobility of these particles will be small and decrease with increasing particle size.

Figure 6:
FIG. 6 is a micrograph showing a step covered by a conformal coating of arsenosilicate glass produced as the result of a heterogeneous reaction.
Figure 7:
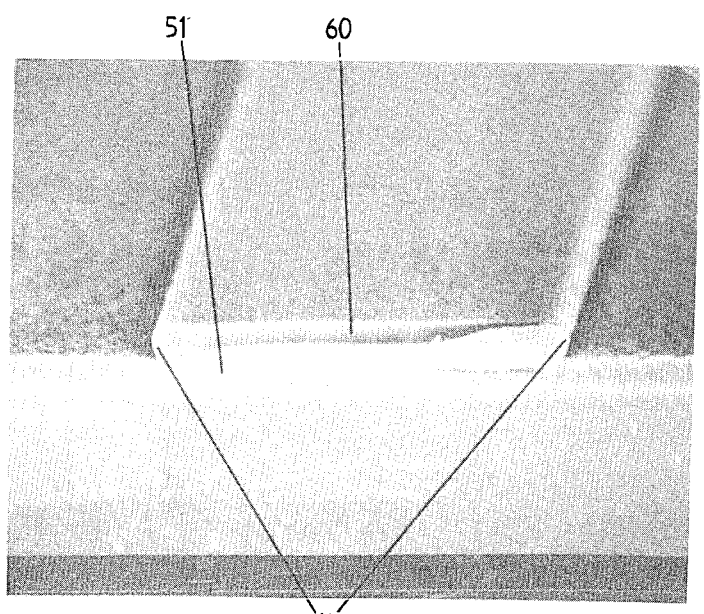
FIG. 7 is a contrasting micrograph showing poor step coverage with phosphosilicate glass as in FIG. 5.

The significance of the heterogeneous reaction is that the deposition rate is controlled by the surface temperature and not by the geometry of the surface, and hence one may expect such a reaction to give conformal oxide coatings. Moreover in a heterogeneous reaction the silane and oxygen are absorbed onto a surface where they subsequently react to form silicon dioxide. As these absorbed species will be very mobile, good step coverage and smooth surfaces should result. FIG. 5 shows the smooth surface produced as a result of heterogeneous reaction, and should be compared with FIG. 4 which shows a typical equivalent (PSG) deposited from a homogeneous reaction. FIG. 6 shows a conformal coating 50 of ASG over a 1 μm high aluminium track 51 with near vertical side walls 52. This should be compared with FIG. 7 which shows a typical non-conformal coating 60 produced as a result of a homogeneous reaction between silane and oxygen. The results of the homogeneous reaction can be seen as overhangs 61 and 62 at the sides of the track 51; such overhangs are typical of the non-conformal deposition which characterises homogeneous reactions.

The conformal coating of ASG as shown in FIG. 6 was produced with the instrument settings given in the following example:

EXAMPLE

| EXAMPLE Gas | Rotameter reading height in mm |
|---|---|
| Main $N_2$ | 56 |
| 5% $SiH_4$ in $N_2$ | 40 |
| 1% $A_sH_3$ in $N_2$ | 44 |
| Dilution $N_2$ | 56 |
| Oxygen | 95 |
| This equals 61 cc/minute of pure $SiH_4$ | |
| 14 cc/minute of pure $A_sH_3$ | |
| 2500 cc/minute of pure $O_2$ | |

The zone pressures were maintained as above at 13 psi Zone A; 11 psi Zone B; 12 psi Zone C Plate temperature=450° C. 3-inch silicon wafers placed in outer circle of an 18 wafer plate. Thin film deposition of rate of ASG=575 A/minute.

Glass deposited under these conditions was found to have an intrinsic stress of $5 \times 10^8$ Dynes $cm^{-2}$ tensile. The glass had a composition of 12 mol % $A_{s2}O_3$, 88 mol % $SiO_2$.

Figure 8:
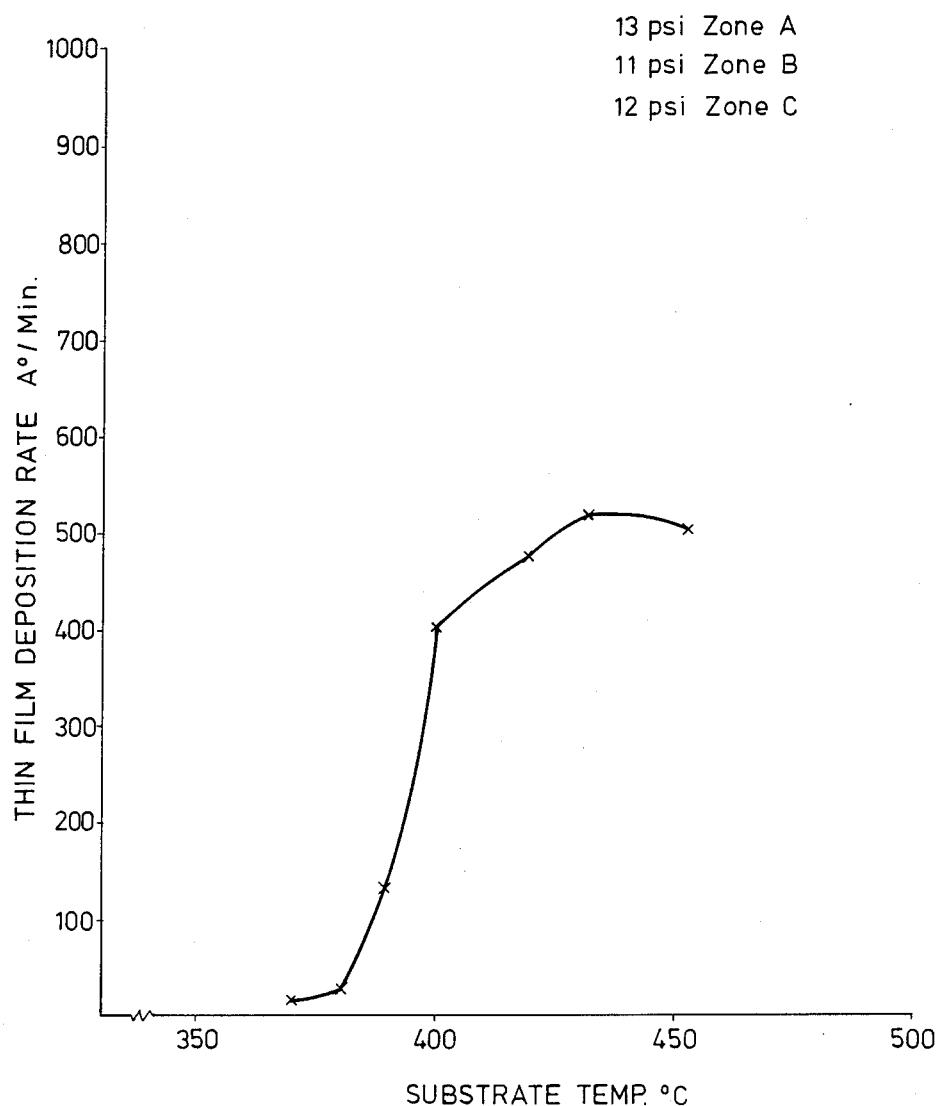
FIG. 8 is a graph of deposition rate against temperature for the silane-arsine-oxygen system.

Satisfactory conformal coatings have been produced with silane:arsine ratios between about 3.8:1 and 11.7:1. A deposition rate versus temperature curve for a silane flow rate of 60 cc minute$^{-1}$ and an arsine flow rate of 10 cc min$^{-1}$ (with 2500 cc min$^{-1}O_2$, main $N_2$=38. Liters min$^{-1}$, and dilution $N_2$=38 Liters min$^{-1}$) is shown in FIG. 8.

It has been found that in general an increase in oxygen and/or silane concentration favours a homogeneous reaction and an increase in arsine concentration favours heterogeneous reaction.

The following gas mixtures, used under the conditions set out above, have been found to give the reaction type indicated:

| Run | Arsine ml/min | Silane ml/min | Oxygen l/min | Nitrogen l/min | Reaction |
|---|---|---|---|---|---|
| A | 6.5 | 61 | 1.4 | 76 | heterogeneous |
| B | 3.1 | 31 | 1.4 | 76 | homogeneous |
| C | 6.5 | 76 | 1.4 | 76 | heterogeneous |
| D | 6.5 | 113 | 1.4 | 76 | homogeneous |
| E | 6.5 | 148 | 1.4 | 76 | homogeneous |

The As$_2$O$_3$ content of the glasses produced under heterogeneous reaction conditions were as follows:

Run A 6% when deposited at 400° C, 4% when deposited at 450° C.

Run C 3% when deposited at 400° C., 2% when deposited at 450° C.

The films will reflow in O$_2$, steam and POCl$_3$/O$_2$.

With 17 mole % As$_2$O$_3$ (not produced as a conformal film), complete reflow has been achieved in 3 minutes at 800° C. in steam. FIGS. 9 and 10 show the cross section of ASG films (8000A 17 mole % As$_2$O$_3$) that have been deposited on polysilicon steps (5000A high with plasma etched near vertical walls) and reflowed in steam for 15 minutes. The film in FIG. 9 was flowed at 800° C. and FIG. 10 at 900° C.

Following reflowing in steam a bake in oxygen at 600° C. is advisable to remove water from the film.

Films deposited directly onto silicon should not be baked in pure nitrogen or argon, as this may lead to the formation of elemental arsenic at the ASG/silicon interface.

As noted above, arsenic trioxide (As$_2$O$_3$) has a significant vapour pressure over ASG and it can readily be lost by evaporation when the glass is heated. Since the melting point of the glass decreases progressively with an increasing concentration of dopant oxide, it should be possible to flow a glass containing a high proportion of As$_2$O$_3$ at a relatively low temperature and in the same process remove some of the As$_2$O$_3$.

Many analytical techniques have been used to determine the composition of doped oxide films, but infrared spectrophotometry (IRS) is the popular technique for rapid routine determinations. A calibration graph for ASG films, which relates absorption peak intensities to film composition has been generated by Wong and Ghezzo (J Electrochem Soc V118, No 9, p1540, 1971) who used the X-ray microprobe analysis of the films and the flame spectrophotometric analysis of the dissolved films as calibration standards.

In a subsequent investigation of densified ASG films Wong found that IR analysis, which indicated that the As$_2$O$_3$ content had decreased during densification, did not agree with the X-ray microprobe analysis, which indicated that no change had occurred (J Electrochem Soc V120 p122 1973). He concluded that it was a physical change in the glass matrix and not a compositional change that was causing the change to the IR spectrum.

To investigate the metrix effect for our ASG layers we deposited films of ASG (2000A, 10 mole % As$_2$O$_3$) on silicon wafers (1000 ohm cm p type) some of which had a 400A layer of oxide grown on the surface to prevent the diffusion of arsenic (As) into the silicon. The films were analysed by IR and Rutherford Backscattering (RBS) both before and after densification (980° C., 15 min, 10% O$_2$ in N$_2$) and the results compared.

The RBS spectra of a film deposited on a grown oxide is shown in FIG. 11. Although a brief inspection of the spectra, which were taken before and after densification, shows that As was lost during this processing more information can be obtained from the interpretation of all the spectra tubulated below:

| | SUBSTRATE MOLE % As$_2$O$_3$ | | | |
|---|---|---|---|---|
| | AS DEPOSITED | | AFTER DENSIFICATION | |
| | IR | RBS | IR | RBS |
| Silicon | 10.5 | — | 5.7 | 6.9 |
| Grown Oxide | 10.5 | 12.7 | 6.2 | 7.5 |

The IR results were calculated using Wong and Ghezzo's calibration chart for as-deposited ASG films.

It can be seen that in each case where the IR result is compared to the RBS result the RBS result gives a value that is consistantly about 20% higher. The further conclusions from these results are:

1. The changes in peak intensities observed in the IR spectrum are due to compositional changes and not physical changes in the glass matrix so that IR can be used to monitor As$_2$O$_3$ content during the densification process.

2. During densification As$_2$O$_3$ leaves the film by evaporation from the surface and if the densification is performed on a bare silicon wafer As will diffuse into the substrate, but the quantity will be small compared to that lost by evaporation.

To confirm these results a second series of samples were prepared which had a thicker film of deposited oxide (6000 A). The experiments were repeated, but in this case the films were analysed by IR and atomic absorption spectroscopy of the dissolved films. The conclusions from the previous experiments were confirmed.

FILM DENSIFICATION

To investigate the changes that occur during densification a series of 6000 A ASG films, each with a different composition, were deposited onto silicon substrates with a 400 A oxide film grown on the surface. The composition of the deposited films varied from 1.6 to 17 mole % As$_2$O$_3$. The samples were analysed by IR before and after a typical fabrication sequence that would be used between ASG deposition and first metal deposition. The sequence included a back gettering step using POCl$_3$ at 980° C.

The results from these experiments are plotted on the graph in FIG. 12. It can be seen from the graph that if the initial concentration of As$_2$O$_3$ was below 6.5 mole % then about 25% of it was lost during processing. If the initial concentration was greater than 6.5 mole % then the final concentration always fell to a plateau level of 4.7 mole % (this limit only applies to the particular processing sequence used here: further heating would lead to greater loss). This result indicated that there were two mechanisms by which the As$_2$O$_3$ left the film. The first mechanism which was kinetically fast only occurred if the initial concentration was greater than 6.5 mole %, and should be interpreted as a supersaturated solution expelling the dopant oxide until the saturation limit was reached. The second, slower, mechanism appeared to be the diffusion of the As$_2$O$_3$ to the surface where it was lost by evaporation to the ambient atmosphere.

To verify the latter mechanism a depth profile of the As$_2$O$_3$ concentration was required. As it has been shown that errors can occur when Auger electron spectroscopy/depth profiling is used to evaluate doped oxide films it was decided to obtain an IR depth profile. Once the IR spectrum of a densified film has been recorded it was etched in a solution of 5% HF to remove a layer 500 to 1000 A thick from the surface of the film. The IR spectrum of the thinner remaining film was recorded and by comparing the two spectra the composition of the dissolved layer could be calculated. By repeating this sequence of etching and recording the IR spectrum a depth profile of the whole film could be obtained.

A typical result from a film that contained an initial concentration of 13 mole % $As_2O_3$ is shown in FIG. 13. The graph clearly shows the concentration gradient caused by the diffusion of $As_2O_3$ from the surface. The $P_2O_5$ generated during the back gettering step can be seen diffusing from the surface into the film creating a near-surface layer of arsonophosphosilicate glass which should give the film better gettering properties.

Although loss of arsenic occurs on heating the film, there need not be a corresponding fall in refractive index. The reason for this is apparently that the densification which occurs on heating (at least by 600° C.) raises the refractive index, offsetting the fall due to arsenic loss. Other workers have observed similar increases in refractive index on heating and densifying $SiO_2$. For example, Pliskin and Lehman, in J Electrochem Soc Vol 112, No 10, pages 1013–1019, report an increase in refractive index from 1.43 to 1.46 for $SiO_2$ heated in steam at 850° C. for 15 minutes. It should be realised however that once the film has been densified, which can be done at 600° C., continued or repeated heating will drive off more arsenic, and the refractive index would be expected to fall.

Arsenosilicate glass containing 12 mole % arsenic was deposited, under heterogeneous reaction conditions (mass transport limited region) on a 3" silica wafer (type Q2 3W55.10.C, made by the Hoya corporation) to a depth of 2 $\mu$m at a temperature of 450° C., at a rate of 400A per minute. A reference silicon wafer was also coated at the same time, and the ASG thickness measured on that by optical interference techniques. The thickness was found to vary by about ±3% across the 3" wafer. A prism coupler and helim neon (6328A) laser were used to determine the filmthickness and refractive index of the film on the silica wafer. The thickness measurements agreed with that carried out on the silicon wafer. The film was found to be bimodal (at 6328A). The effective index of the zero order TE and TM modes was found to be 1.502, and that of the first order TE and TM modes 1.477. The bulk refractive index of the film calculated to be about 1.53, about 0.07 above that of silica, and agrees well with that measured on the similar film on silicon. The decay of the scattered light (6328A) along the propagating beam was measured and loses of between 0.3 and 0.5 dB cm$^{-1}$ for the fundamental mode, and 0.8 to 1.2 dB cm$^{-1}$ for the first order mode were determined. Examination of the uncoupled reflected light beam indicate a very low level of scatter loss.

EXAMPLE 2

Similar samples were baked at 600° C. for 15 minutes in an oxygen atmosphere. The values for effective refractive index were: zero order, 1.5087; first order, 1.479. The very close agreement between these figures and those obtained on the as deposited samples, are, within the limits of experimental error, the same. This result is a little surprising in that the fall in index due to arsenic loss was apparently closely balanced by the increase in index due to densification.

Figure 14:
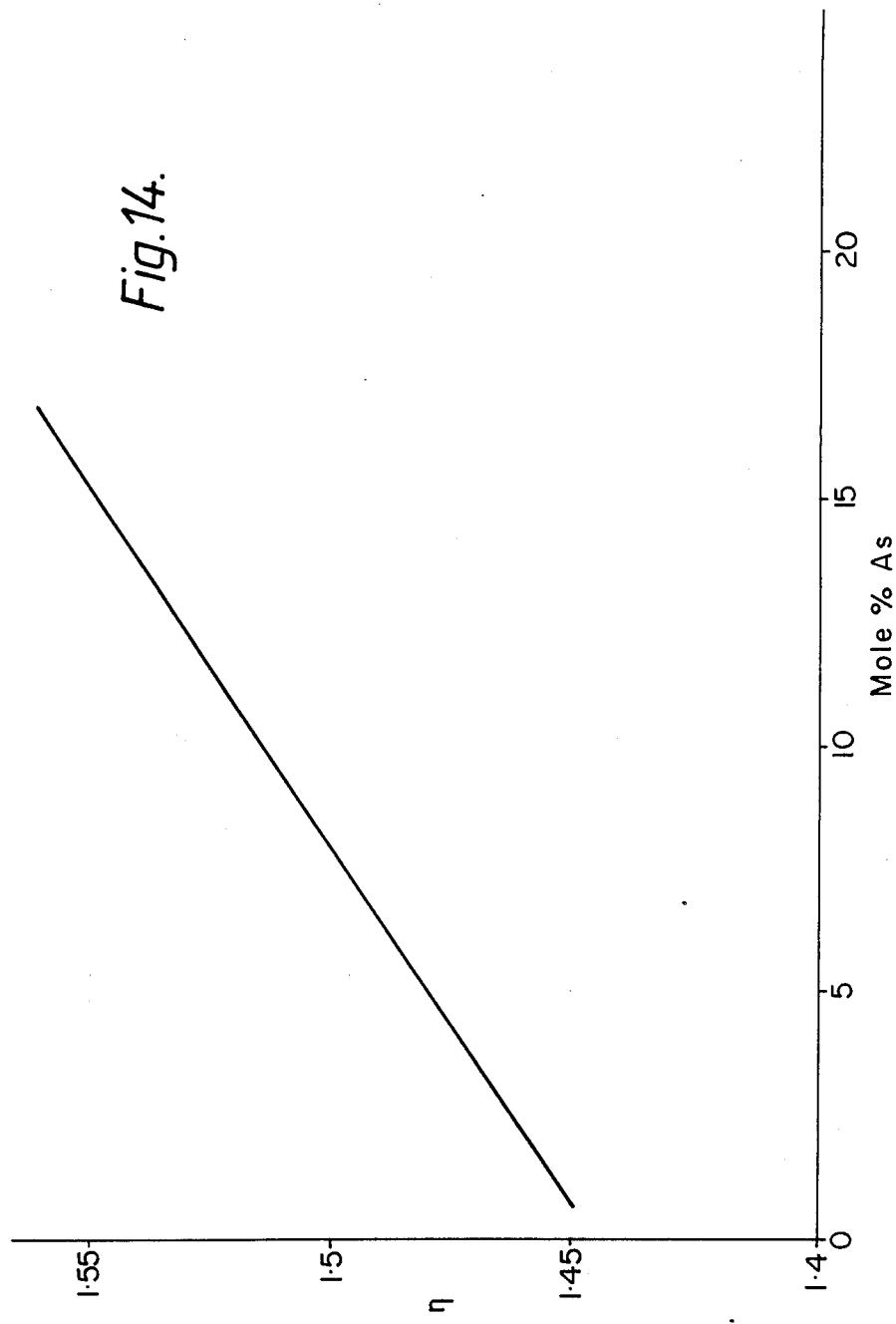
FIG. 14 is a graph showing the relationship between refractive index and arsenic content in arsenosilicate glass.

The substantially linear relationship between refractive index and arsenic content for as deposited films is shown in FIG. 14.

A simple waveguide can be made with just a guiding layer of ASG on a silica or other suitable substrate. However, ASG is also well suited to manufacture of buried waveguide devices. Because surface scatter loss is dependent upon the refractive index difference across the surface, buried waveguides, which reduce that difference can have reduced scatter loss. As can be seen from FIG. 14, it is possible to vary the refractive index of ASG between about 1.45 and 1.53 by varying the arsenic content between about 2 and 12%.

EXAMPLE 3

Figure 15:
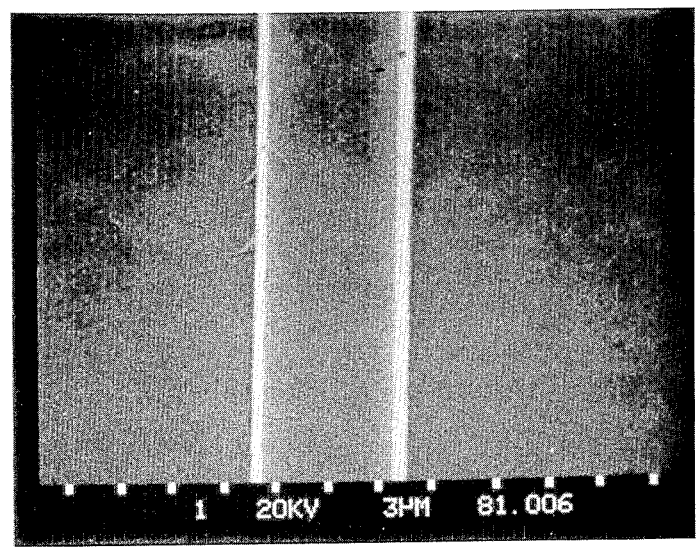
FIG. 15 is a micrograph showing the smooth surface of an arsenosilicate glass waveguide.
Figure 16:
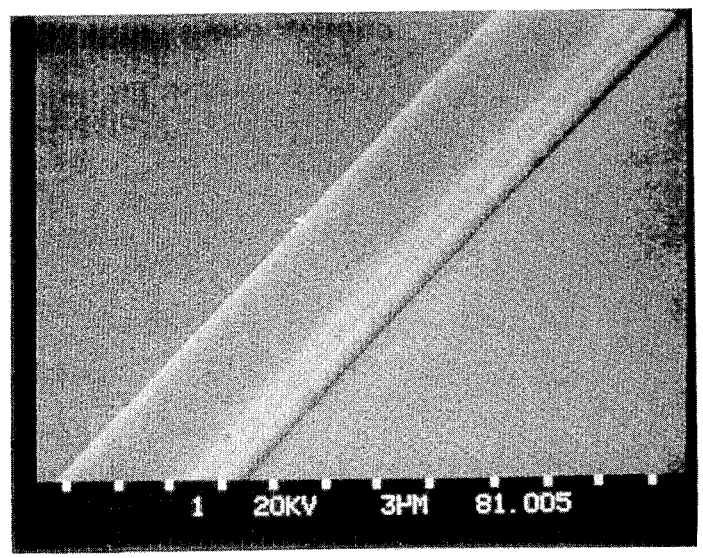
FIG. 16 is a micrograph showing the ripple-free sides of an arsenosilicate glass waveguide.

A2.5 $\mu$m layer of ASG containing 10 mole percent $As_2O_3$ (n 1.52) was deposited on a silica slice. A 500A layer of aluminium was evaporated onto the back of the substrate to facilitate mask aligment. Next a 1 $\mu$m layer of positive resist was spun onto the ASG layer. The waveguide pattern was then printed using a contact mask, and the resist developed to define the pattern. The ASG layer was plasma etched in a $C_2F_6$/$CHF_3$/HE atmosphere (oxygen being excluded to prevent erosion of the resist mask). The remaining resist was stripped. Finally the aluminium was removed from the rear side. Waveguides produced by this technique are shown in FIGS. 15 and 16. Of particular note are the waveguides's very smooth top and its freedom from edge ripple. FIG. 16 clearly shows the waveguide's smooth sides.

The increased loss of arsenic from the surface layers on heating ASG, gives rise to the possiblity of producing a pseudo buried waveguide structure. The move heavily doped region adjacent the substrate would form the guiding layer, while the depleted surface layers would produce a more gradual index change between the guiding layer and air, reducing scatter loss.

Adopting a conventional approach to the fabrication of a buried waveguide structure, two separate ASG layers may be provided. A heavily doped layer, with 10–12 mole % arsenic, 2 $\mu$m thick is deposited for the guiding layer. Using standard microlithographic techniques (coat with photo/electron beam resist, expose, develop resist to define pattern, wet or plasma etch) a passive device structure such as a ring resonator, beam splitter, or coupler etc can be formed in the first layer. Next, a second layer, with 2–4% arsenic, 3 $\mu$m thick is deposited to bury the first.

It plasma etching is used it may be necessary to briefly reflow the first ASG layer to remove wall roughness before depositing the second layer.

Depending upon the desired arsenic content, the reaction temperature can be reduced to about 390° C. However, to ensure uniform thickness it is advisable to operate in the mass transport limited region—where deposition rate is less sensitive to temperature changes.

Although the heterogeneous reaction produces ASG films of low stress, some cracking has been observed with films of 5 $\mu$m thickness. Where more than one layer is deposited, reflowing earlier layers should reduce the incidence of cracks in later layers, enabling greater overall thickness to be built up.

Since the ASG can be deposited at temperatures between about 390° and 450° C., provided no reflowing is required it can be used in conjuction with III-V semiconductors. With a suitable buffer layer (which could be a low arsenic ASG layer) between the ASG III-V compound, ASG may be deposited on a substrate of III-V material. Such an approach would enable monolithic optical integrated circuits to be fabricated, using active (light generating) components such as lasers fabricated from III-V compounds.

It would also be possible to integrate ASG with a lower index cladding of an optically active material, e.g. an optically active organic material.

We claim:

1. An optical waveguide comprising a guiding portion of arsenosilicate glass, the arsenosilicate glass consisting essentially of silicon, oxygen and arsenic, the arsenic content of the arsenosilicate glass being from 1.7 to 17 mole percent.

2. An optical waveguide as claimed in claim 1, wherein the guiding portion has a thickness of at least 2 μm.

3. An optical waveguide as claimed in claim 1, wherein the waveguide exhibits a loss of not more than 0.5 dB cm$^{-1}$ for the fundamental mode with light having an in vacuo wavelength of 6328 Å.

4. An optical waveguide as claimed in claim 1, wherein the guiding portion is formed on a substrate having a higher refractive index than that of the guiding portion and at least one intermediate layer having a refractive index lower than that of the guiding portion lying between the substrate and the guiding portion.

5. An optical waveguide as claimed in claim 4, wherein the substrate comprises a slice of single-crystal semiconductor.

6. An optical waveguide as claimed in claim 1, wherein the guiding portion is formed on the surface of a generally planar substrate from which it stands proud, and wherein the guiding portion is buried beneath a layer of deposited material having a refractive index lower than that of the guiding portion.

7. An optical waveguide as claimed in claim 6, wherein said deposited material comprises arsenosilicate glass of lower refractive index than that of the guiding portion.

8. An optical waveguide as claimed in claim 1, wherein the guiding portion is overlaid with a layer of optically active material of lower refractive index.

9. An optical waveguide as claimed in claim 1, wherein the arenosilicate glass of the guiding portion contains between 3 and 6 mole percent arsenic.

10. An optical waveguide as claimed in claim 1, wherein the arsenosilicate glass of the guiding portion has a bulk refractive index of between 1.53 and 1.47 at 6328 Å.

11. A method of fabricating an optical waveguide comprising the step of forming a guiding layer of arsenosilicate glass on a substrate, the arsenosilicate glass consisting essentially of silicon, oxygen, and arsenic, and the arsenic content of the arsenosilicate glass being from 1.7 to 17 mole percent.

12. A method as claimed in claim 11, wherein the arsenosilicate glass is produced in a chemical vapor deposition process by reactions between silane and oxygen in the presence of arsine, wherein the reactions between silane and oxygen are predominantly of a heterogeneous nature.

13. A method as claimed in claim 12, wherein the volume ratio of silane to arsine lies in the range 3.8 to 1 to 11.7 to 1, and the volume ratio of oxygen to silane lies in the range 18.5:1 to 41:1.

14. A method as claimed in claim 12, wherein the reaction is carried out at a temperature below 500° C.

15. A method as claimed in claim 14, wherein the reaction is carried out at a temperature of between 390° and 450° C.

16. A method as claimed in claim 11, comprising the additional steps of:
(i) providing a layer of masking material over said arsenosilicate glass layer;
(ii) defining a pattern in said layer of masking material; and
(iii) removing parts of said arsenosilicate glass layer using the patterned layer of masking material to define a pattern in the arsenosilicate glass.

17. A method as claimed in claim 16, wherein plasma etching is used to remove the arsenosilicate glass in additional step (iii).

18. A method as claimed in claim 17, wherein the plasma etching is carried out in an atmosphere comprising $C_2F_6$, $CHF_3$ and He.

19. A method as claimed in claim 11, comprising the additional step of forming a second layer of arsenosilicate glass over the first.

20. A method as claimed in claim 19, wherein the second arsenosilicate glass layer has a lower arsenic content than the first.

21. A method as claimed in claim 11, comprising the step of heat treating the arsenosilicate glass layer to produce an arsenic concentration gradient with the arsenic content of the glass layer decreasing gradually towards the surface remote from the substrate.

* * * * *